United States Patent [19]

Yano et al.

[11] Patent Number: 4,997,556
[45] Date of Patent: Mar. 5, 1991

[54] OIL FILTER I

[75] Inventors: Hisashi Yano; Hiroyuki Ihara, both of Yokohama; Junsuke Yabumoto, Atsugi; Ryuzi Kuwavara, Yokohama; Masanori Nishiya, Chigasaki, all of Japan

[73] Assignee: Mitsubishi Oil Co., Ltd., Tokyo, Japan

[21] Appl. No.: 420,148

[22] Filed: Oct. 11, 1989

[30] Foreign Application Priority Data

| Dec. 26, 1988 | [JP] | Japan | 63-326003 |
| Feb. 15, 1989 | [JP] | Japan | 1-16756[U] |
| Feb. 15, 1989 | [JP] | Japan | 1-16757[U] |
| Apr. 6, 1989 | [JP] | Japan | 1-39958[U] |
| Apr. 6, 1989 | [JP] | Japan | 1-39959[U] |
| Apr. 6, 1989 | [JP] | Japan | 1-39960[U] |
| Apr. 6, 1989 | [JP] | Japan | 1-39961[U] |
| Apr. 24, 1989 | [JP] | Japan | 1-46811[U] |
| Apr. 25, 1989 | [JP] | Japan | 1-47650[U] |
| Apr. 25, 1989 | [JP] | Japan | 1-47651[U] |

[51] Int. Cl.⁵ .......................................... B01D 19/00
[52] U.S. Cl. ................................. 210/136; 210/168; 210/304; 210/307; 210/308; 210/314; 210/440; 210/493.2; 210/497.01; 210/512.1; 210/DIG. 13; 210/DIG. 17; 55/191; 55/203; 184/6.24
[58] Field of Search ............... 210/136, 168, 304, 307, 210/308, 314, 316, 433.1, 440, 444, 493.2, 497.01, 512.1, DIG. 13, DIG. 17, 256, 309, 454; 55/191, 199, 203, 204, 207; 184/6.24

[56] References Cited

U.S. PATENT DOCUMENTS

| 1,770,774 | 7/1930 | Hackett | 55/204 |
| 2,705,053 | 3/1955 | Morris | 210/512.1 |
| 2,811,218 | 10/1957 | Winslow | 210/304 |
| 2,983,384 | 5/1961 | Winslow | 210/304 |
| 3,127,255 | 3/1964 | Winslow | 210/304 |
| 3,586,171 | 6/1971 | Offer | 210/314 |
| 3,771,290 | 11/1973 | Stethem | 210/512.1 |
| 3,845,840 | 11/1974 | Thrasher | 55/276 |
| 3,898,068 | 8/1975 | McNeil | 55/337 |
| 4,263,025 | 4/1981 | Godare | 55/191 |
| 4,707,165 | 11/1987 | Tauber et al. | 210/168 |
| 4,865,632 | 9/1989 | Yano et al. | 55/204 |
| 4,878,924 | 11/1989 | Yano et al. | 55/204 |

Primary Examiner—W. Gary Jones
Assistant Examiner—Mathew O. Savage
Attorney, Agent, or Firm—Barnes & Thornburg

[57] ABSTRACT

An oil filter comprising a housing opened at one end, a first separator unit in the housing for removing solid contaminants from the oil and a second separator unit for removing gaseous contaminants. The first separator unit includes a cylindrical filter element and upper and lower end plates attached to the upper and lower ends of the filter element. The second separator unit is disposed in the space defined by the inner periphery of the filter element and between the upper and lower end plates. It includes a chamber arranged to generate a vortical flow of the oil introduced thereof to thereby separate gas-rich oil which gathers in an axially central portion of the chamber, a first outlet for discharging the gas-rich oil and a second outlet for the oil containing little gaseous contaminants, the first and second outlets extending into the housing from the open end thereof.

46 Claims, 12 Drawing Sheets

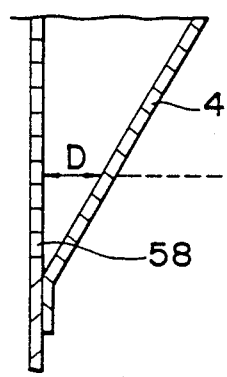
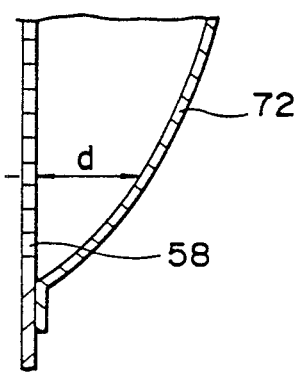
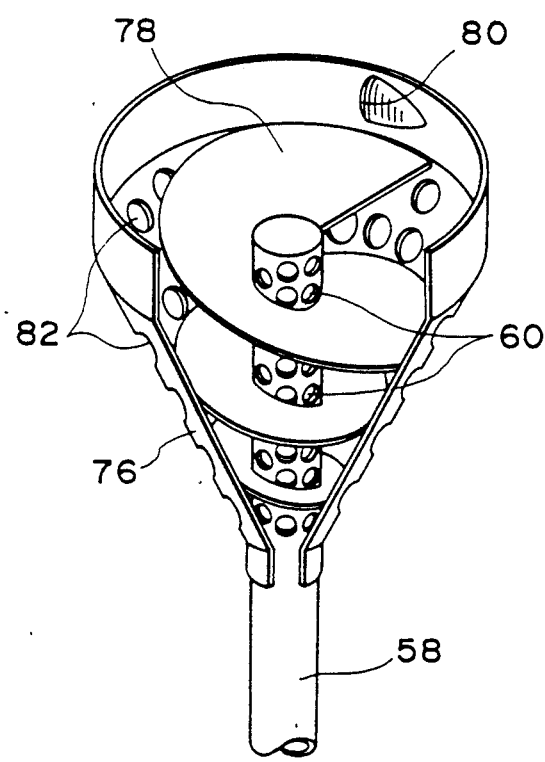
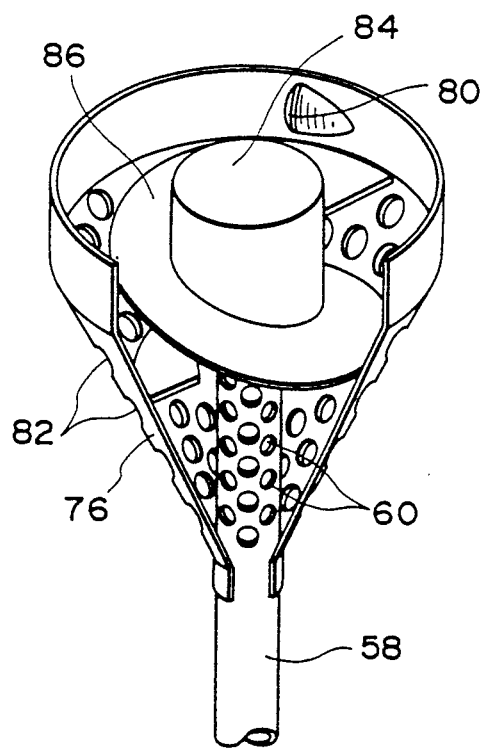

0
OIL FILTER I

BACKGROUND OF THE INVENTION

1. Field of the Invention

The present invention relates to an oil filter to be incorporated in a lubricating system for an internal combustion engine or the like and, more particularly, to an oil filter of a type in which not only solid contaminants 1 but also gaseous contaminants can be removed from the oil.

2. Description of the Prior Art

In machinery for construction, transportation and the like using lubricant, such as engines and various hydraulic devices, solid contaminants and gaseous contaminants have hitherto been removed from lubricant by separate devices and/or in different portions of the machinery. An integrated device has thus been desired which can remove both of the solid and gaseous contaminants effectively and which can be installed in a limited space of the machinery.

The inventors herein have proposed such an integrated device in a pending Japanese Patent Application No. 202682/88 filed Aug. 16, 1988. The device disclosed therein comprises a first separator for filtering lubricant which is pumped into a housing to thereby remove solid contaminants, and a second separator for removing gaseous contaminants from the filtered oil by utilizing a centrifugal force. Specifically, the second separator has a chamber adapted to generate a vortical flow of the lubricant introduced therein, whereby the lubricant having little gaseous contaminants and therefore having a larger specific gravity gathers in a peripheral area of the chamber while gas-rich lubricant having a smaller specific gravity gathers in a central area. A wall defining the chamber is provided with a plurality of pores through which the gas-removed lubricant flows out of the chamber. On the other hand, the gas-rich lubricant is discharged by a perforated pipe which extends into the chamber along its axis.

In the above proposed device, the second separator projects in the axial direction beyond the first separator unit. Therefore, the axial length of the device must be sufficiently larger than that of each separator, resulting in a difficulty in designing the device to be installed in a small space without spoiling the removal efficiency of contaminants. Further, to incorporate the device into a lubricating system necessarily involves attaching it to a mount in which various passages should be provided to supply the lubricant into the device, lead the filtered and gas-removed lubricant to various parts to be lubricated, and to discharge the gas-rich lubricant into a tank for recirculation. The above device is not so constructed that it may easily be attached to the mount, and a relatively complicated work will be needed for the attachment.

SUMMARY OF THE INVENTION

Accordingly, an object of the invention is to provide an oil filter which can efficiently remove both solid and gaseous contaminants from the oil and which can be miniaturized in dimension without spoiling the removal efficiency.

Another object of the invention is to provide an oil filter which can easily be mounted in a lubricating system.

According to the present invention, an oil filter comprises a housing opened at one end thereof, a first separator unit disposed in said housing for removing solid contaminants from the oil introduced into the housing, and a second separator unit for removing gaseous contaminants from the oil that has passed through the first separator unit. The first separator unit includes a cylindrical filter element and upper and lower end plates attached respectively to the upper and lower ends of the filter element which has outer and inner peripheries The second separator unit is disposed in the space defined by the inner periphery of the filter element and between the upper and lower end plates. It includes a chamber adapted to generate a vortical flow of the oil introduced therein to thereby separate gas-rich oil which gathers in an axially central portion of the chamber, a first outlet passage means for discharging the gas-rich oil outside the oil filter, and a second outlet passage means for leading the oil containing little gaseous contaminants outside the oil filter. These first and second outlet passage means extend into the housing from the open end thereof.

In a preferred embodiment of the invention, the second separator unit further includes a cylindrical casing having an open end and a bottom wall, a cyclone secured in the casing for defining the chamber in cooperation with the bottom wall, and an inlet formed in the wall of the casing for introducing the oil into the chamber along a tangential direction of the casing. The first outlet passage means may comprise a removal pipe extending into the chamber along the axis of the cyclone and having formed in the wall thereof a plurality of orifices for permitting the gas-rich oil to flow thereinto. The second outlet passage means may include a plurality of pores formed in the wall of the cyclone.

Other objects, features and advantages of the invention will be apparent from the following description of the preferred embodiments thereof when taken in conjunction with the accompanying drawings.

BRIEF DESCRIPTION OF THE DRAWINGS

FIGS. 5(A) and (B) are fragmentary views of cyclones in second separator units of FIG. 1 and FIG. 4, respectively;

FIG. 7 is a partly cut-away perspective view of a cyclone in FIG. 6;

FIG. 8 is a view similar to FIG. 7 showing a modified form of the cyclone;

DESCRIPTION OF THE PREFERRED EMBODIMENTS

Figure 1:
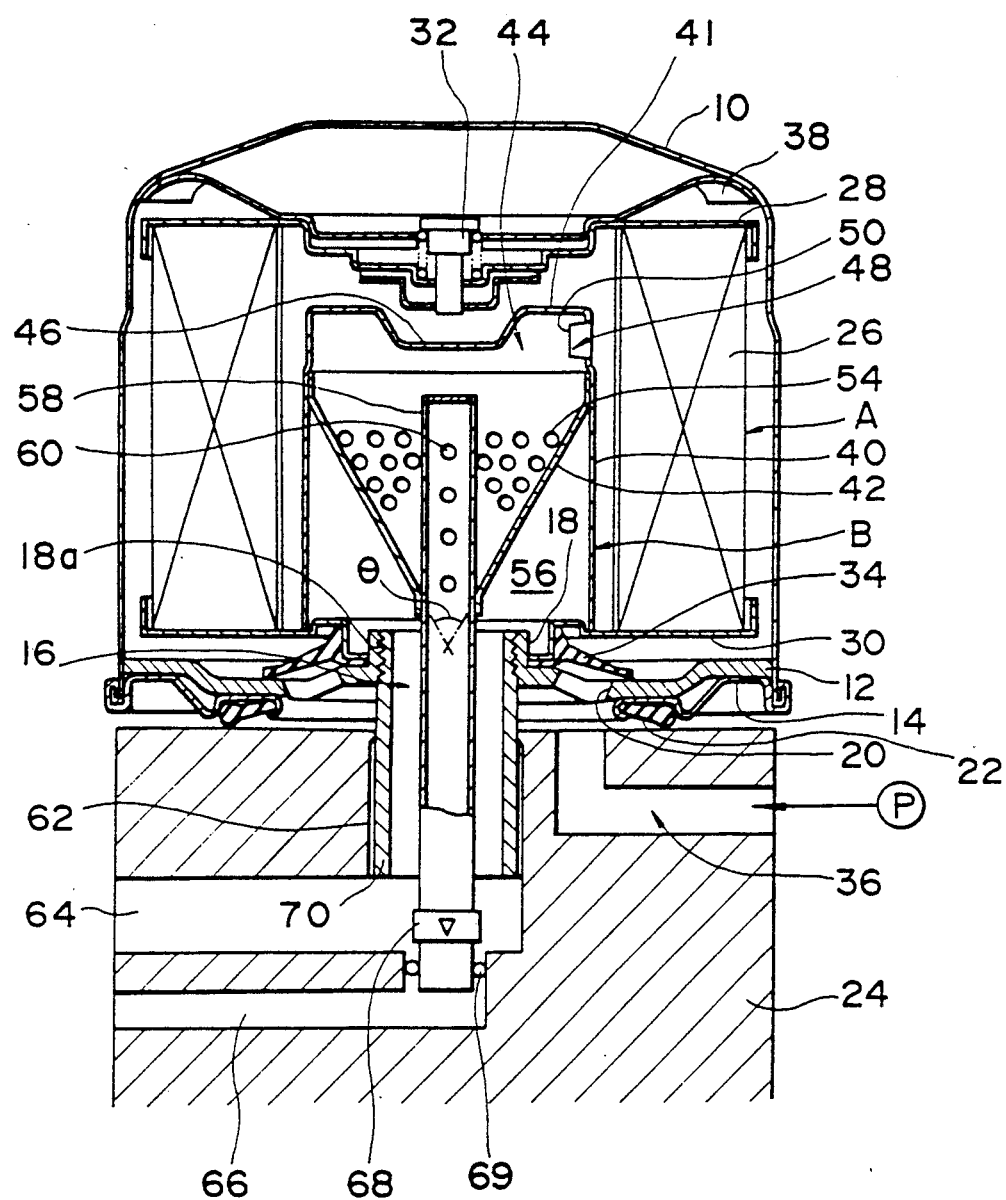
FIG. 1 is a longitudinally sectioned elevational view illustrating an oil filter according to an embodiment of the invention.

Referring first to FIG. 1 of the drawings, an oil filter according to a first embodiment of the invention has a housing 10 of substantially cylindrical shape having a lower open end and an upper closed end. A base plate or disk 12 is secured to an inner peripheral surface of the housing 10 at a position near its lower end and is fixedly supported by means of a ring member 14 of which outer edge is seamed with the lower edge of the housing 10. The base plate 12 is formed with a central opening 16 defined by an upwardly projecting circular wall 18 which has a threaded inner surface 18a. An aperture 20 is provided in the base plate 12 radially outward of the opening 16, and is surrounded by a gasket 22 that seals a space between the base plate 12 and an upper surface of a mount block 24 to which the housing 10 is attached.

Arranged within the housing 10 are a separator unit A for separating solid contaminants from an oil circulating in a lubricating system of a machine, and a separator unit B for separating gaseous contaminants in the oil. The separator unit A is of usual type and comprises a filter element 26, an upper end plate 28 and a lower end plate 30 both fixed to the element 26. The filter element 26 has a hollow cylindrical shape and is typically formed of a pleated sheet. The upper end plate 28 extends radially inward to support a relief valve 32 which is positioned substantially at a center of the housing 10. This relief valve 32 is adapted to open and provide a bypass passage for the oil when a pressure of oil is increased outside the filter element 26 due to a clogging thereof, so that the oil can flow through the valve 32 into the space defined within the element 26. On the other hand, the lower end plate 30 extends to the wall 18 where a check valve 34 is secured for preventing a reverse flow of the oil from the housing into an inlet passage 36 that is formed in the mount block 24 and communicates with the aperture 20 in the base plate 12. The unit A is held in position by a spring 38 which is compressed between the upper end of the housing 10 and the upper end plate 28.

Figure 2:
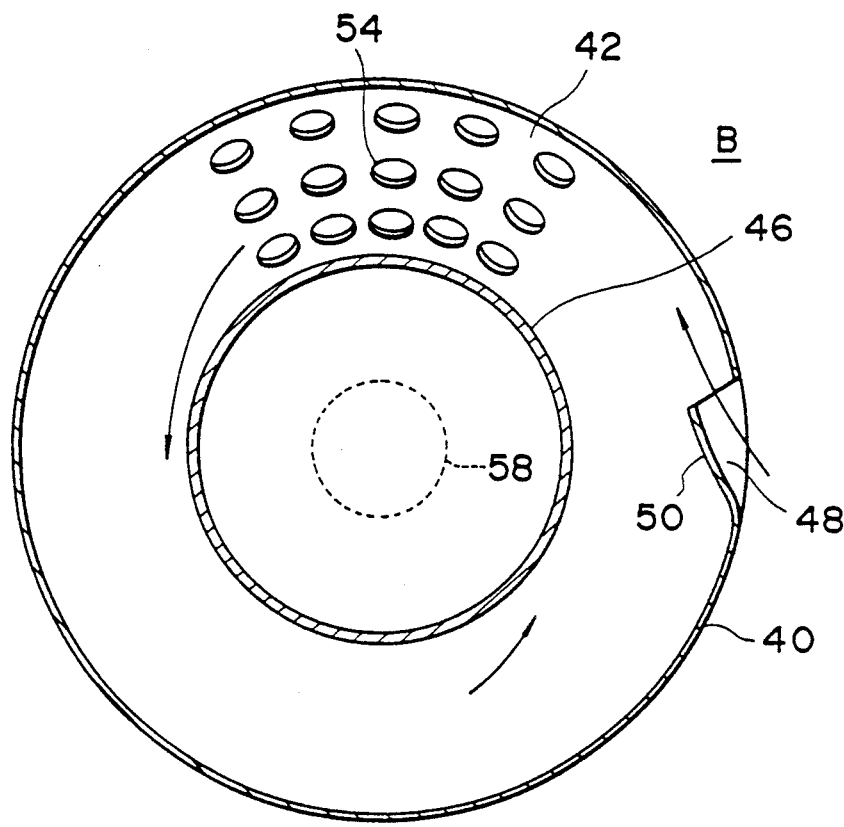
FIG. 2 is a cross-sectional view of a second separator unit in the oil filter of FIG. 1.

The separator unit B is disposed at the center of the housing 10 and has a length along an axis of the housing smaller than the length of the unit A so that it is entirely surrounded by the filter element 26 and is accommodated between the upper and lower end plates 28 and 30. The unit B includes a cylindrical casing 40 of which lower edge is secured to the extension of the end plate 30. A funnel-shaped member or cyclone 42 is housed within the casing 40 and is attached at its upper vertical portion to the peripheral surface of the casing 40, defining together with a bottom wall 41 of the casing 40 a chamber 44 which is adapted to create a vortical flow of the oil as described hereinafter. The bottom wall 41 has at a center thereof a concave portion 46 projecting into the chamber 44. Formed through the peripheral wall of the casing 40 at a position above the cyclone 42 is an inlet 48 for introducing the oil into the chamber 44. If desired, plural inlets may be provided at angular intervals. As shown in FIG. 2, the inlet 48 is formed by punch press with providing a guide wall or deflector 50 extending inwardly relative to a tangent of the casing 40 at the inlet 48 so that the oil introduced therethrough flows in a vortical pattern.

Figure 3:
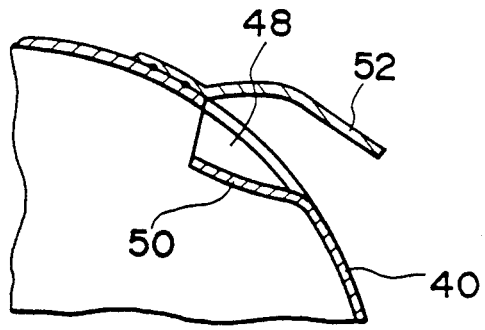
FIG. 3 is a fragmentary sectional view showing another form of an inlet in the second separator unit.

Instead of providing the deflector, the inlet itself may be so formed as to extend along the tangential direction if the peripheral wall of the casing 40 has a sufficient thickness. Alternatively, a guide plate 52 is formed separately from the casing 40 and is welded thereto at a position opposite to and overlapping the deflector 50, as shown in FIG. 3. In FIGS. 2 and 3, arrows indicate a direction of flow of the oil.

Referring again to FIG. 1, the concave portion 46 preferably extends to a level equal to or below the inlet 48 so that the periphery of portion 46 may fully contribute to the generation of vortical flow. A plurality of pores 54 are formed through the wall of the cyclone 42 to connect the chamber 44 with a space 56 which is defined between the cyclone 42 and the casing 40 and communicates with the central opening 16. A removal pipe 58 having an upper closed end extends in the opening 16 and projects into the cyclone 42. The lower vertical portion of cyclone 42 is fixed to the pipe 58 to orient the latter along the axial center of the chamber 44. The upper portion of pipe 58 in the chamber 44 is formed with small orifices 60 through which a gas-rich oil flows into the pipe 58 as described later.

The mount block 24 has a central hole 62 which is aligned with the opening 16 and communicates with a first outlet passage 64 formed in the block 24. The removal pipe 58 extends through the central hole 62 and in the first outlet passage 64, and its lower end opens into a second outlet passage 66 that is also formed in the block 24 below the first passage 64. An O-ring 69 is provided around the pipe 58 to separate the first and second passages from each other. The first passage 64 is connected to, for example, an engine (not shown) to be lubricated while the second passage 66 is connected to, for example, an oil pan (not shown) for storing &he oil. A pressure-regulating valve 68 is disposed in the removal pipe and adapted to open for discharging the gas-rich oil to the oil pan through the second passage 66 when a pressure in the pipe 58 exceeds a predetermined value. Fitted in the central hole 62 is a sleeve 70 which extends into the opening 16 to threadedly engage with the wall 18 of the base plate 12, thereby attaching the housing 10 to the block 24.

When the oil is supplied by a pump P via the inlet passage 36, it flows into the oil filter through the aperture 20 and the check valve 34. The oil then passes through the filter element 26 from outside to inside during which solid contaminants are removed from the oil. The thus filtered oil flows in the space between the element 26 and casing 40 and is introduced into the chamber 44 through the inlet 48 which, together with the deflector 50, contributes to the creation of vortical flow. The concave portion 46 prevents the oil from flowing radially inwardly and intensifies the vortical flow. The oil flows downward in the chamber 44 with the vortical pattern, generating a centrifugal force which acts on the oil. Due to a difference in density, the oil containing gaseous contaminants, i.e. gas-rich oil, is separated and gathers near the axial center of the flow where it is introduced through the orifices 60 into the removal pipe 58 for discharge into the oil pan via the second outlet passage 66. On the other hand, the remaining oil, which contains little gaseous contaminants, flows around the wall of cyclone 42 and passes through the pores 54 into the space 56 for circulation in the lubricating system via the central opening 16, hole 62 and the first outlet passage 64.

In this way, solid and gaseous contaminants can efficiently be separated and removed from the oil. Attachment of the housing 10 to the mount block 24 is facilitated since the removal pipe 58 extends in the attachment sleeve 70 which also provides the passage for the filtered oil. Further, the unit B for separating gaseous contaminants is completely accommodated within the unit A for separating solid contaminants both in the radial and axial directions, enabling to miniaturize the whole device and facilitating an assembly and attachment thereof. The downwardly extending passages allow the relief valve 32 to be arranged at the axial center in the upper part of housing 10, so that the valve 32 may effectively function in response to the increase of oil pressure.

In FIG. 1, an angle $\theta$ of the cyclone 42 should preferably be in the range from 20 to 120 degrees, more preferably from 40 to 80 degrees. This serves to prevent an occurrence of turbulence of the oil and to increase an angular acceleration of the vortical flow.

Figure 4:
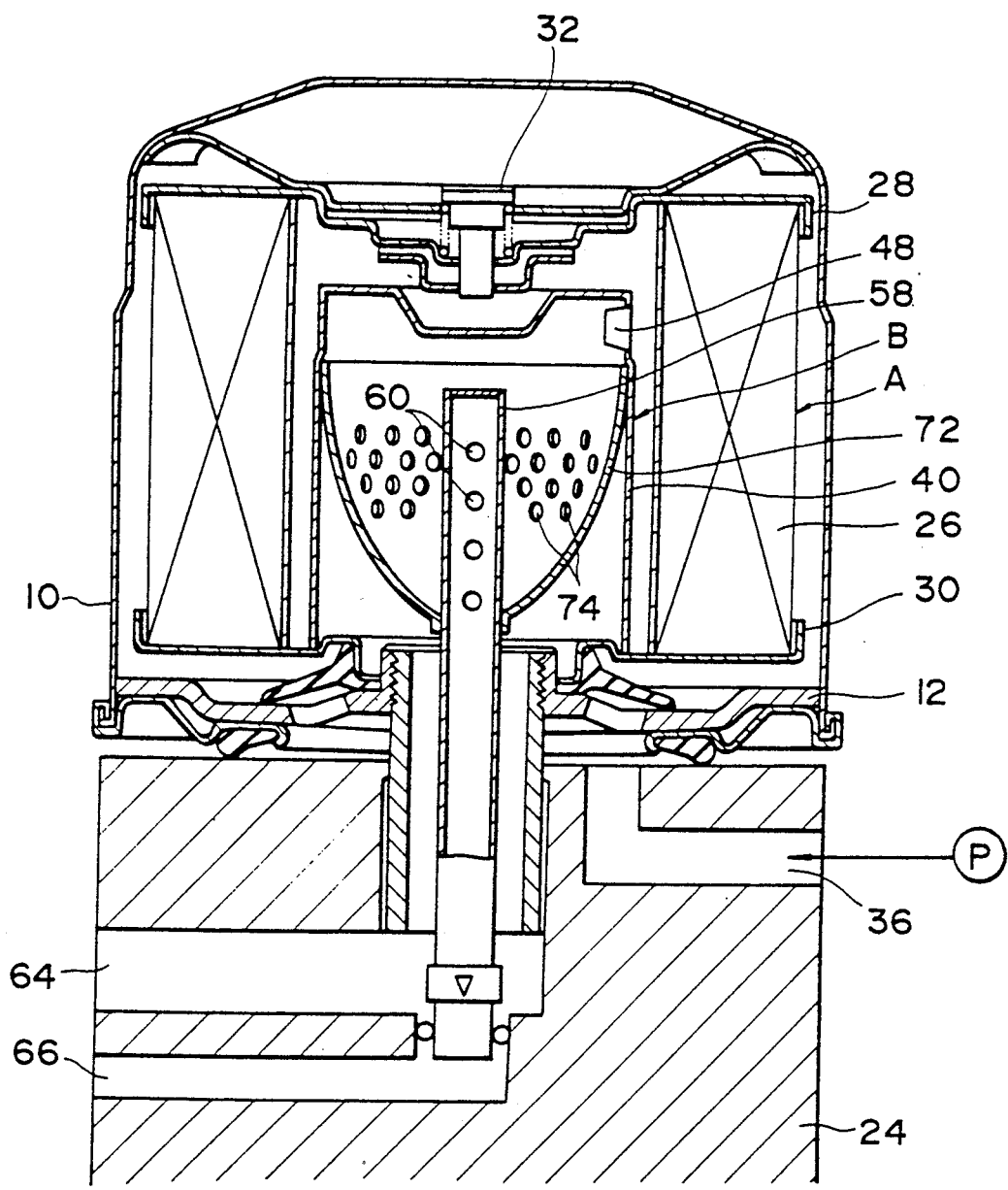
FIG. 4 is a view similar to FIG. 1 illustrating an oil filter according to another embodiment of the invention.

FIG. 4 illustrates an oil filter according to another embodiment of the invention, which is different from the above embodiment in a shape of cyclone 72. Thus, the cyclone 72 has a parabolic shape in longitudinal cross section containing a center axis thereof, the parabola converging to the lower end which defines an aperture for the removal pipe 58. Because of the parabolic shape, the cyclone 72 has a surface area larger than that of the funnel-shaped cyclone 42 in FIG. 1. This enables to increase the number of pores 74 to permit the oil containing little gaseous contaminants to flow out of the cyclone 72 more quickly and smoothly. Further, as can be seen from FIGS. 5(A) and (B), a distance "d" between the removal pipe 58 and the cyclone 72 at the lower part of the latter is substantially larger than a distance "D" at the corresponding point in the funnel-shaped cyclone 42. Such a larger distance is advantageous in preventing the gas-rich oil from mixing with the oil flowing in the outer portion of the chamber, resulting in an improved separation or filtering of the oil.

Figure 6:
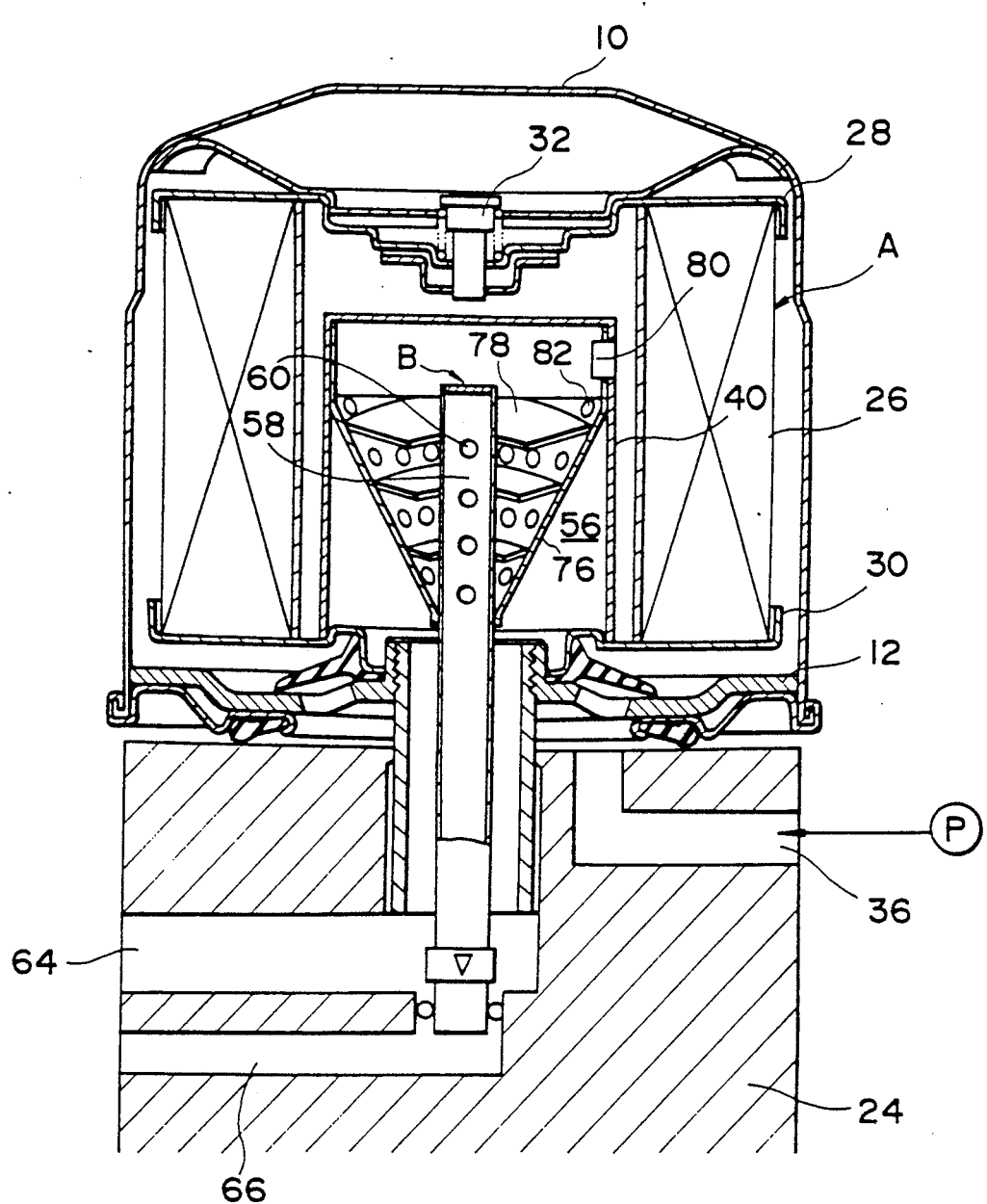
FIG. 6 is a view similar to FIG. 1 illustrating an oil filter according to still another embodiment of the invention.

Another preferred form of cyclone is shown in FIGS. 6 and 7 in which a helical guide 78 is fixed between an inner surface of a cyclone 76 and the outer surface of removal pipe 58. The guide 78 has an upper end positioned just below an inlet 80 and extends in the direction of oil flow to the lower end of the cyclone 76. The oil introduced into the chamber through inlet 80 flows downwardly along the helical guide 78, so that the vortical flow of the oil is intensified to strengthen the centrifugal force. A helical pitch of the guide 78 may be determined in view of an initial velocity of the oil at inlet 80 etc. As in the above embodiments, the cyclone 76 is formed with pores 82 through which the separated oil containing little gaseous contaminants passes into the space 56.

A variation in FIG. 8 includes a large-diametered column 84 attached to the upper end of pipe 58, and a helical guide 86 having a reduced width around the column and terminating at the axially intermediate portion of the cyclone 76. The column 84 restrains the oil through the inlet 80 from flowing radially inward. That is, even if a portion of the oil flows toward the center of chamber, the column 84 forcedly changes the direction of flow into the vortical pattern along the guide 86. Because the vortical flow is intensified at the initial stage, it can be fully maintained to the lower end of cyclone 76. If desired, the column may be provided with orifices communicating with the pipe 58.

Figure 9:
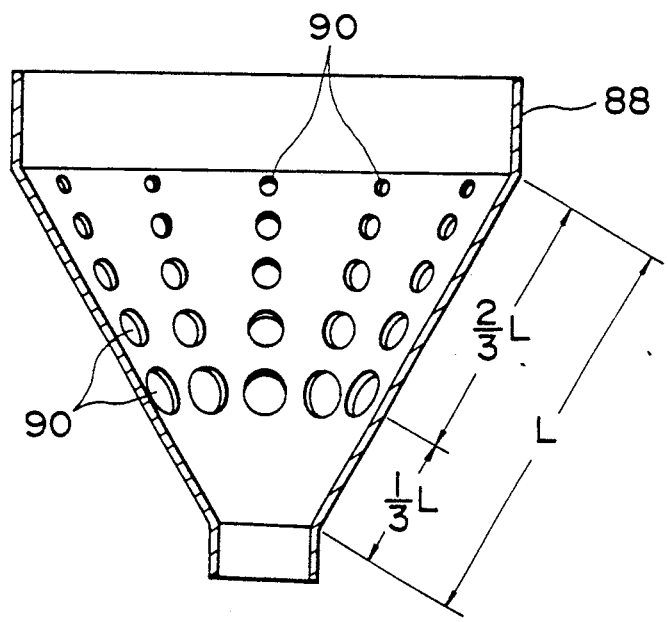
FIG. 9 is a longitudinally sectioned elevational view of another preferred form of a cyclone.

When the funnel-shaped cyclone is employed, it is preferable that the pores are provided in the upper and intermediate portions of the cyclone and that the lower portion thereof is not perforated, as illustrated in FIG. 9. This is preferable because the gas-rich oil flowing around the pipe 58 would be apt to flow into the space 56 if the pores were formed in the lower portion where the wall of cyclone approaches the pipe 58. In the illustrated example, an entire length of the conical portion as measured along the slope is indicated by "L" and only the portion having two-thirds ($\frac{2}{3}$) of L from the bottom is formed with pores 90 of which size increases toward the top of the cyclone 88, i.e. in a downstream direction of oil flow. The uppermost, smallest pores have a diameter of about 0.5 mm while a diameter of the lowermost, largest ones is about 5 mm, for example. Such dimensional variations permit the oil to flow around the wall of cyclone with a pressure loss of less than 1 kg/cm$^2$. Also, the oil flow increases its velocity toward the lower portion of cyclone, and the increasing size of pores 90 allows the filtered oil to flow out therethrough efficiently.

Figure 10:
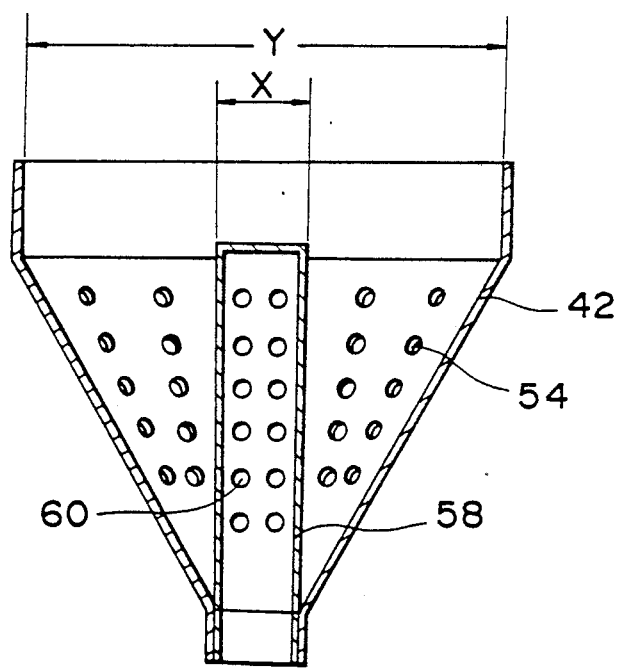
FIG. 10 is also a longitudinally sectioned elevational view for use in explaining dimensional relation between a cyclone and a removal pipe.

The present inventors have found through extensive experiments that a ratio of the outer diameter X of the removal pipe 58 to a maximum inner diameter Y of the funnel-shaped cyclone 42 (see FIG. 10) should be set within a particular range, in order to remove gaseous contaminants effectively without substantially lowering an oil pressure at the lubricating system. The inventors manufactured several samples of cyclones in which the ratio X/Y was varied from 0.5 to 0.1, incorporated each sample into the oil filter of FIG. 1 and mounted the latter to an engine for measurement of removal efficiency of gaseous contaminants in the oil. The removal efficiency was measured by operating the engine at constant speed for a predetermined period of time, extracting a fixed volume of oil from the lubricating system into a test tube to measure a weight "w", and comparing that weight with a weight "W" of another test tube which contains the same volume of fresh oil having no gaseous contaminants. The following Table shows the results of the experiments in which the engine speed was varied between 3,000 and 6,000 rpm, the removal efficiency w/W being indicated in percentage.

TABLE 1

| Engine Speed (rpm) | X/Y* | | | | |
|---|---|---|---|---|---|
| | 0.5 | 0.35 | 0.20 | 0.15 | 0.10 |
| 3000 | 98.0 | 98.8 | 99.2 | 99.1 | 97.4 |
| 4000 | 96.4 | 97.2 | 97.6 | 97.6 | 94.7 |
| 5000 | 94.1 | 95.7 | 96.3 | 96.3 | 89.5 |
| 6000 | 93.5 | 94.4 | 94.9 | 95.0 | 87.2 |
| | | | (%) | | |

*X: Outer diameter of removal pipe
Y: Maximum inner diameter of cyclone

As can be seen from the Table 1, the removal efficiency was remarkably lowered in each engine speed when the diameter ratio X/Y was reduced below 0.15 and set at 0.10. On the other hand, the ratio X/Y exceeding 0.35 and setting at 0.50 did not critically affect the removal efficiency but was found to substantially lower the oil pressure at passage 64 due to an increase of oil that flowed into the pipe 58 through orifices 60. This causes a shortage of oil to be supplied to the engine. Therefore the diameter ratio X/Y should preferably be set between 0.15 and 0.35.

Also, a preferable size of orifice 60 is in the range from 0.5 to 10 mm in diameter, more preferably from 1.0 to 5.0 mm, and the orifices 60 are uniformly distributed around the pipe 58. Such size and arrangement of orifices allow the gaseous contaminants collected in the central portion of cyclone 42 to be quickly removed into the pipe 58 while minimizing the inflow of oil thereinto to maintain the pressure and flow rate of oil at sufficient level.

As is well known in the art, it is necessary to replace the filter element for separating solid contaminants with a new element when it is clogged after a long use, and the replacement requires detaching the oil filter from, and then attaching it to, the mount block. On the other hand, the separator unit B for separating gaseous contaminants is durable and can be used substantially permanently.

Figure 11:
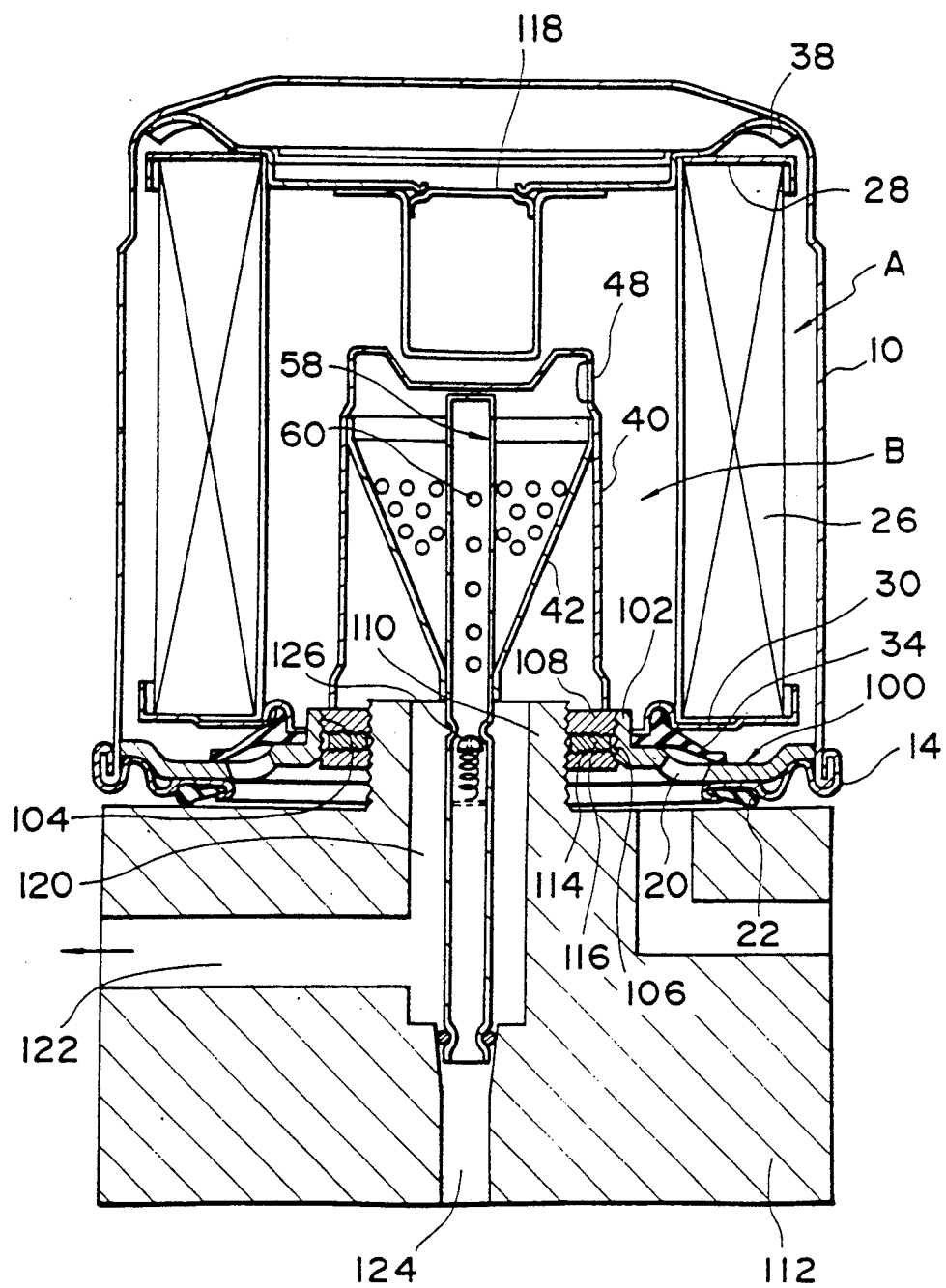
FIG. 11 is a view similar to FIG. 1 illustrating an oil filter according to still another embodiment of the invention.

In an embodiment illustrated in FIG. 11, a base plate 100 has an upwardly projecting circular wall 102 defining a large-diametered central opening 104. An inner surface of the wall 102 is threaded as at 106, and the inner end of the lower end plate 30 of separator unit A abuts against an outer surface of wall 102. Threadedly engaged with the surface 106 is an outer circumferential surface of a base ring 108 on which the lower end of the casing 40 of separator unit B is fixedly mounted. The base ring 108 has also an inner threaded surface to engage with threads formed on an outer periphery of a sleeve 110 that is integral with a mount block 112 and extends from upper central portion thereof. The separator unit B is thus secured to the mount block 112. The base ring 108 is provided with a radial hole 114 in which a threaded pin 116 is fitted for preventing a rotation of the base ring 108 relative to the sleeve 110.

A relief valve 118 is attached to the center of upper end plate 28 for the purpose described above. The sleeve 110 defines a hole 120 which extends into the block 112 to communicate with a first outlet passage 122 leading to the engine. The removal pipe 58 extends in the hole 120 and opens to a second outlet passage 124 aligned with the hole 120 for discharging the gas-rich oil. Reference numeral 126 denotes a pressure-regulating valve in the pipe 58.

When it is desired to replace the filter element 26, the housing 10 is rotated relative to the mount block 112 whereby the wall 102 is released from the engagement with the base ring 108 which is retained by the pin 116 to the mount block 112 together with the separator unit B. In this way, the separator unit A as well as the housing 10 can easily be removed from the block 112 for replacement. Thereafter, the housing 10 is again attached by rotating it in the reverse direction.

Figure 12:
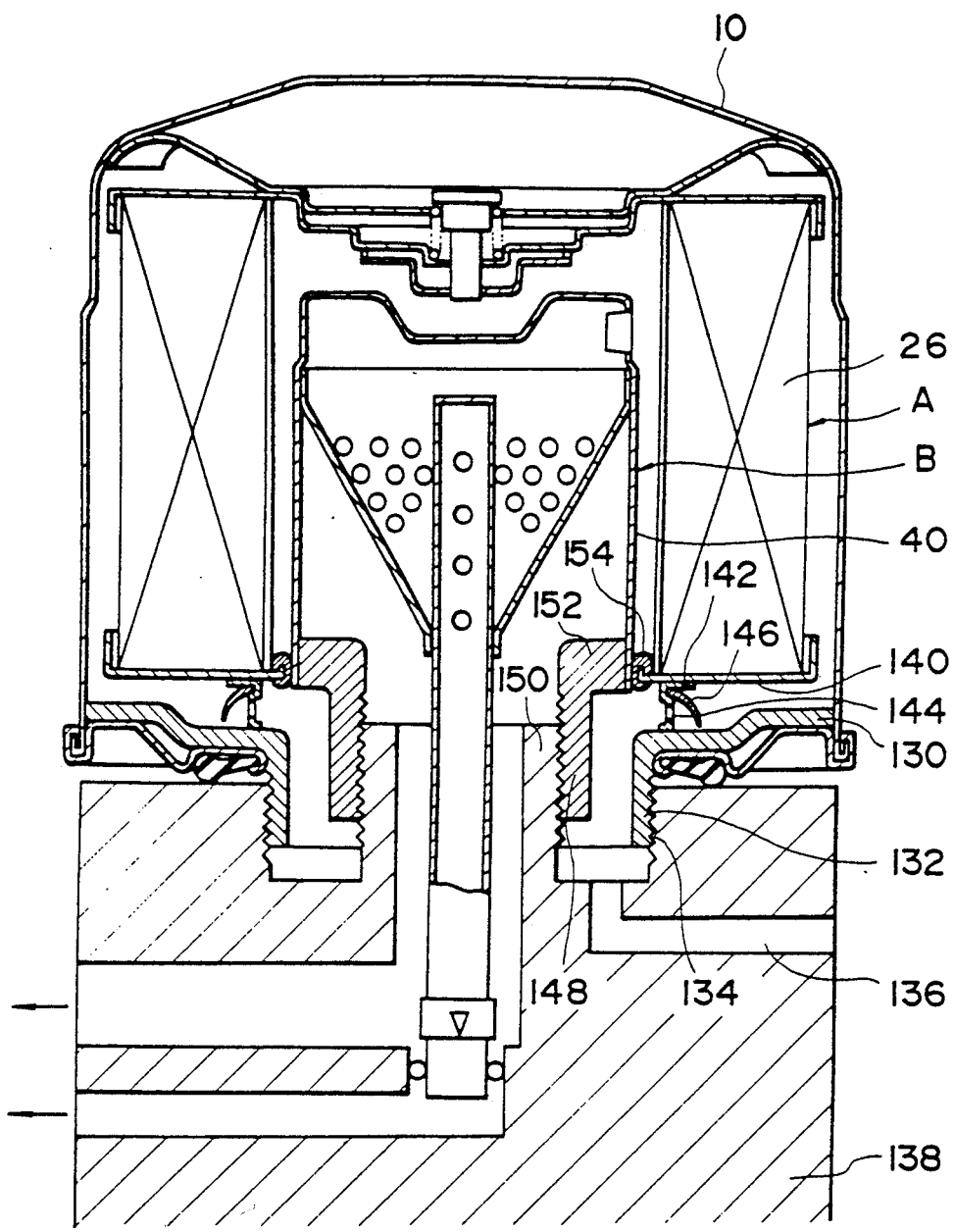
FIG. 12 is also a view similar to FIG. 1 of an oil filter according to a further embodiment of the invention.

A modified form is illustrated in FIG. 12 in which a base plate 130 has a generally L-shaped cross section of which inner end 132 extends downwardly and has a threaded outer surface to engage with threads 134 formed on the wall defining an inlet passage 136 in a mount block 138. A lower end plate 140 of the separator unit A slightly extends inwardly beyond the filter element 26 and is supported by a seat 142 disposed between the plate 140 and the base plate 130. The seat 142 has an aperture 144 for the oil from the passage 136 and a check valve 146 to prevent backflow of the oil. The passage 136 is further defined by a base ring 148 that is threadedly fitted on a central sleeve 150 of the block 138. The base ring 148 extends beyond the upper end of the sleeve 150 and is bent outwardly to form a flange 152 of which end surface is fixed to the lower end of casing 40 of the separator unit B. A gasket 154 is tightly fitted in the circular gap between the end plate 140 and the casing 40 to thereby completely define the passage 136. If desired, the base ring 148 is stationarily secured to the sleeve 150 by suitable means such as adhesive agent or a pin.

As in the embodiment of FIG. 11, the separator unit A can be removed from the mount block 138 by rotating the housing 10 and the base plate 130 fixed thereto relative to the block 138. The separator unit B, secured to the base ring 148, remains on the block 138.

Figure 13:
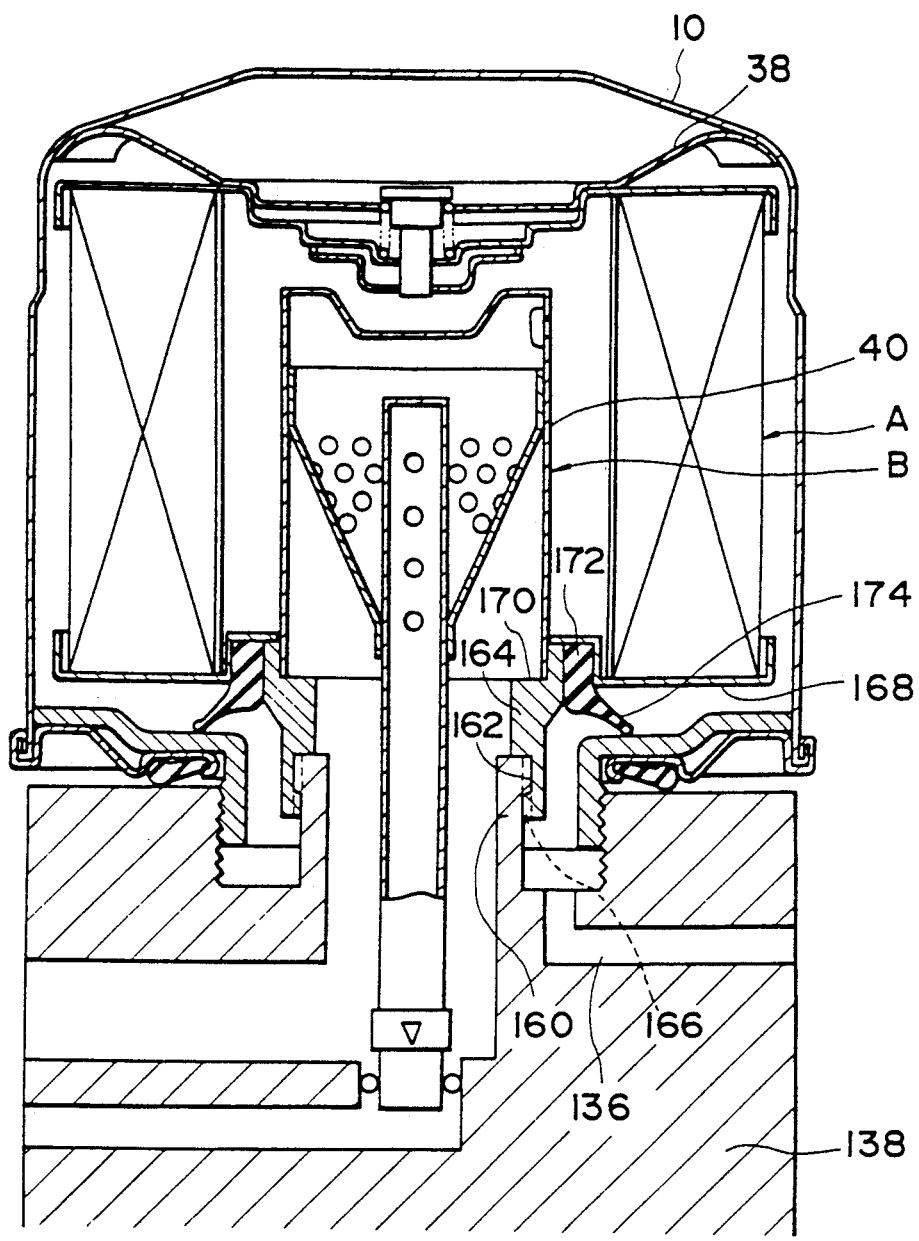
FIG. 13 is a view showing a slightly modified form.

An oil filter shown in FIG. 13 is different from the above one in that a sleeve 160 of the mount block 138 is formed with a spline 162 on which is fitted a base ring 164 having corresponding key ways 166. The spline 162 and key ways 166 prevent the base ring 164 from rotating relative to the block 138. A lower end plate 168 of the separator unit A extends inwardly to rest on the upper end of base ring 164 to which the casing 40 is attached at a shoulder 170. The unit A is thus held in position by the action of spring 38. Tightly fitted in a circular gap between the end plate 168 and base ring 164 is a gasket 172 which is formed integrally with a check valve 174 in the passage 136.

Figure 14:
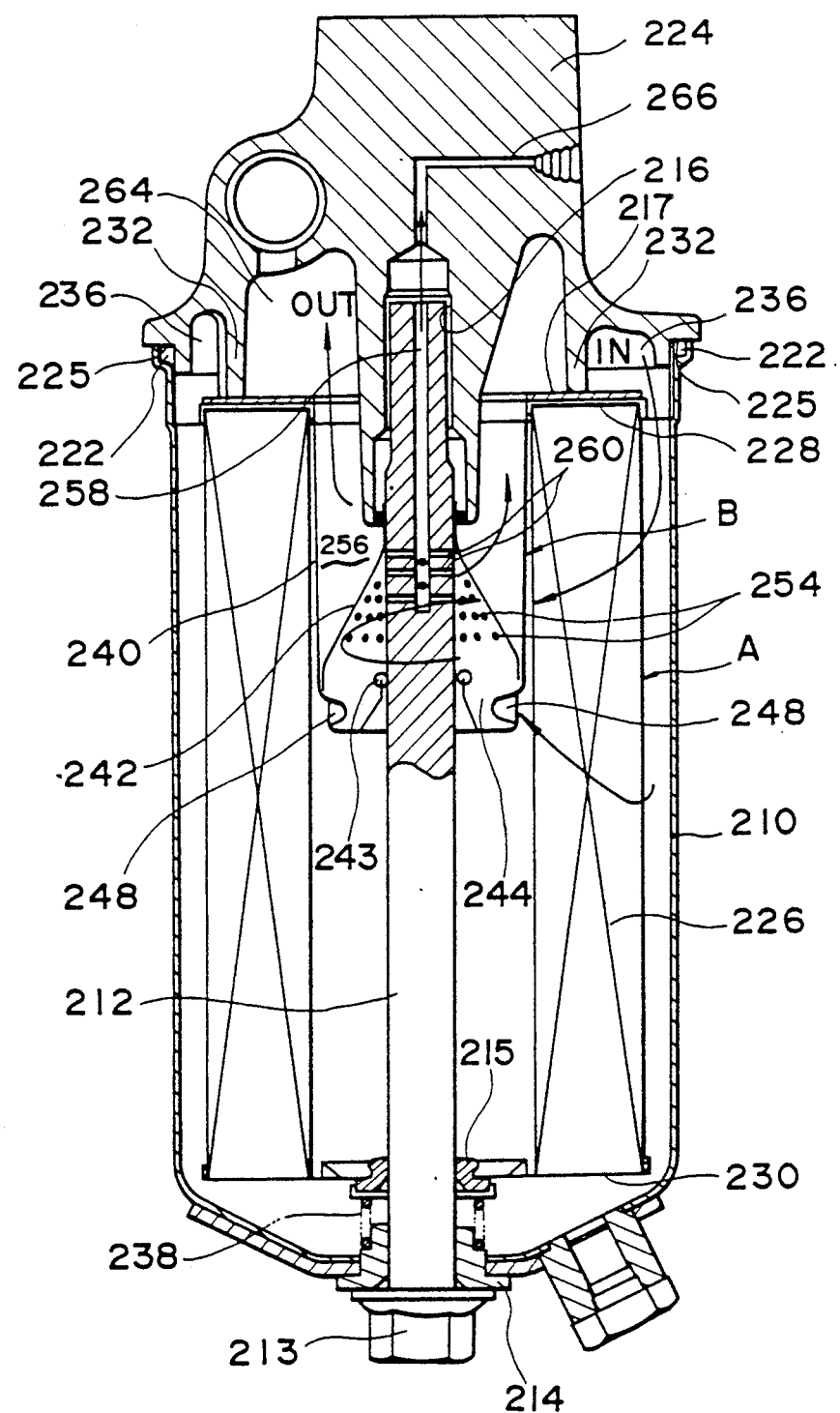
FIG. 14 is a longitudinally sectioned elevational view illustrating an oil filter according to still further embodiment of the invention.

There has been known and available in the market an oil filter of a so-called center bolt type in which a center bolt extends axially through the housing for attaching it to the mount block. In applying the present invention to such an oil filter, attention should be paid to arrangements of the removal pipe and the center bolt. FIG. 14 illustrates one embodiment of the invention as applied to the center bolt type oil filter, which includes an axially elongated housing 210 for accommodating separator units A and B. An open end of the housing 210 is closed by a mount block 224 and sealed by a gasket 222 disposed on the lower peripheral edge 225 of block 224. The housing 210 is attached to the block 224 by means of a center bolt 212 which extends along a center axis of the housing and is threadedly engaged at its upper end with a hole 216 in the block 224. The lower end of center bolt 212 penetrates the bottom wall of the housing 210 with a gasket 214 to provide an enlarged head 213 for fastening or loosening the bolt 212.

As in the above embodiments, the unit A for separating solid contaminants comprises a filter element 226 and upper and lower end plates 228, 230. A gasket 215 is tightly fitted between the center bolt 212 and the lower end plate 230. Provided around the bolt 212 is a spring 238 which is compressed between the gaskets 214 and 215 for urging the unit A upwardly, whereby the upper end plate 228 abuts through a sealing member 217 against an end surface of a circular flange 232 to separate an inlet passage 236 from a first outlet passage 264, both formed in the block 224. The unit B, arranged within the unit A, includes a casing 240 attached at its upper edge to the inner periphery of end plate 228 and a funnel-shaped cyclone 242 secured to the casing 240. The center bolt 212 extends through the unit B along its axis, and suitable sealing such as an 0-ring 243 is provided to prevent any leakage of the oil from the unit B around the bolt 212. A plurality of orifices 260 are formed in the bolt 212 to connect a chamber 244 in the cyclone 242 with a removal passage 258 extending centrally in the upper portion of bolt 212.

The oil supplied into the housing 210 via the inlet passage 236 passes through the filter element 226 while separating solid contaminants, and is then introduced into the chamber 244 from inlets 248. A pressure applied to the oil by a pump (not shown) causes the vortical flow toward the upper end of chamber 244, resulting in a separation of gas-rich oil which gathers around the center bolt 212 and is removed into the passage 258 via orifices 260. The gas-rich oil is finally discharged in an oil pan (not shown) through a second outlet passage 266 communicating with the passage 258. On the other hand, the oil containing little gaseous contaminants flows out of the cyclone 242 through pores 254 into an upwardly opened space 256 in the casing 240, and is led to the first outlet passage 264 connected to the engine. It will be understood that the housing 210 can be detached from the mount block 224 by disengaging the center bolt 212 from the hole 216.

Also, there has recently been developed a "dual type" oil filter having a primary or "full-flow" element and a secondary or "by-pass" element arranged side by side. The primary element is relatively rough and the secondary element is relatively fine. The oil filter of this type is so constituted that the oil passing through the primary element is supplied to the engine while the oil flowing through the secondary element is led to the oil pan, thereby improving removal efficiency of solid contaminants. Oil filters shown in FIGS. 15 and 16 are examples of the present invention as applied to the dual type device.

Figure 15:
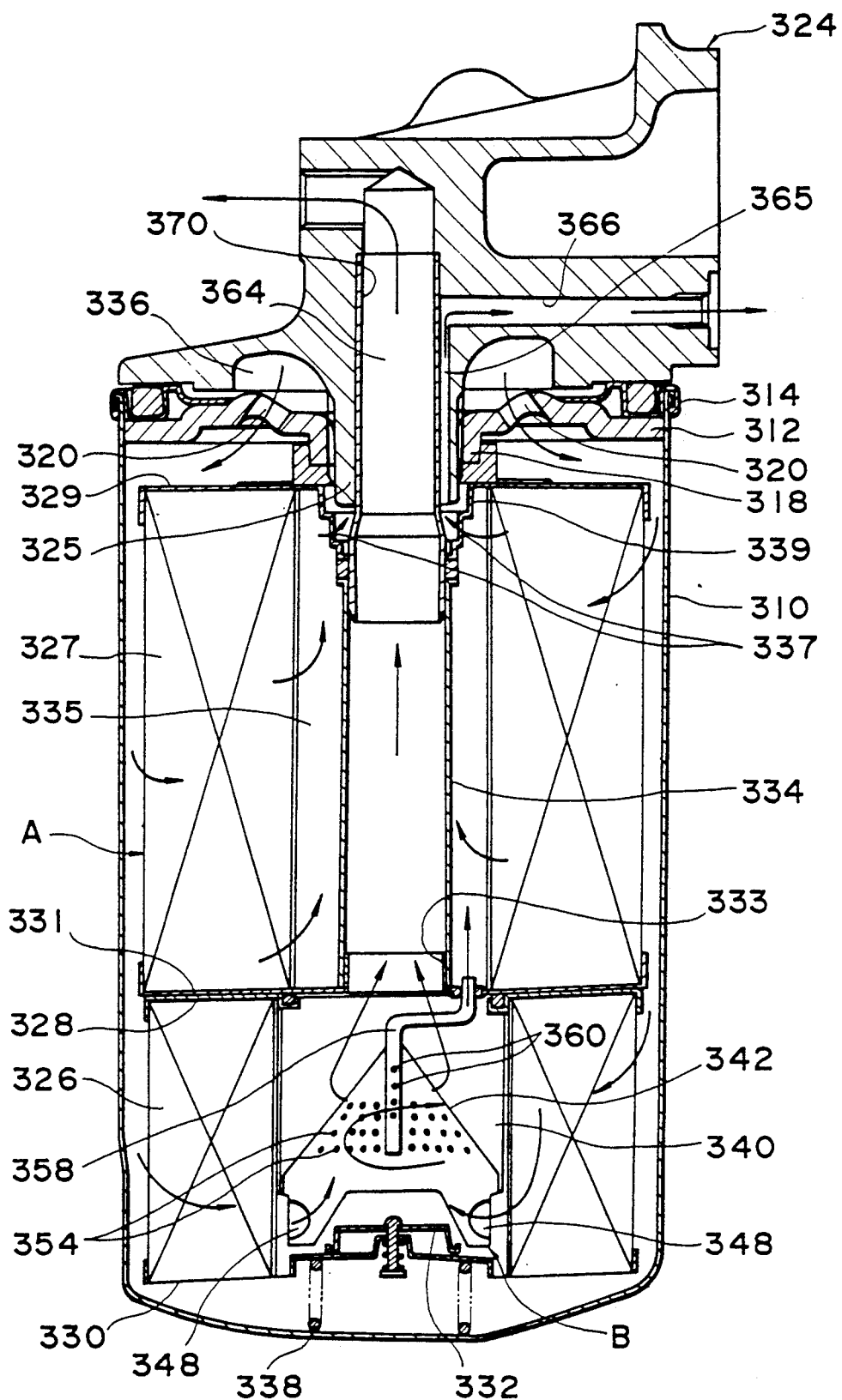
FIG. 15 is also a longitudinally sectioned view of an oil filter according to still another embodiment of the invention.
Figure 16:
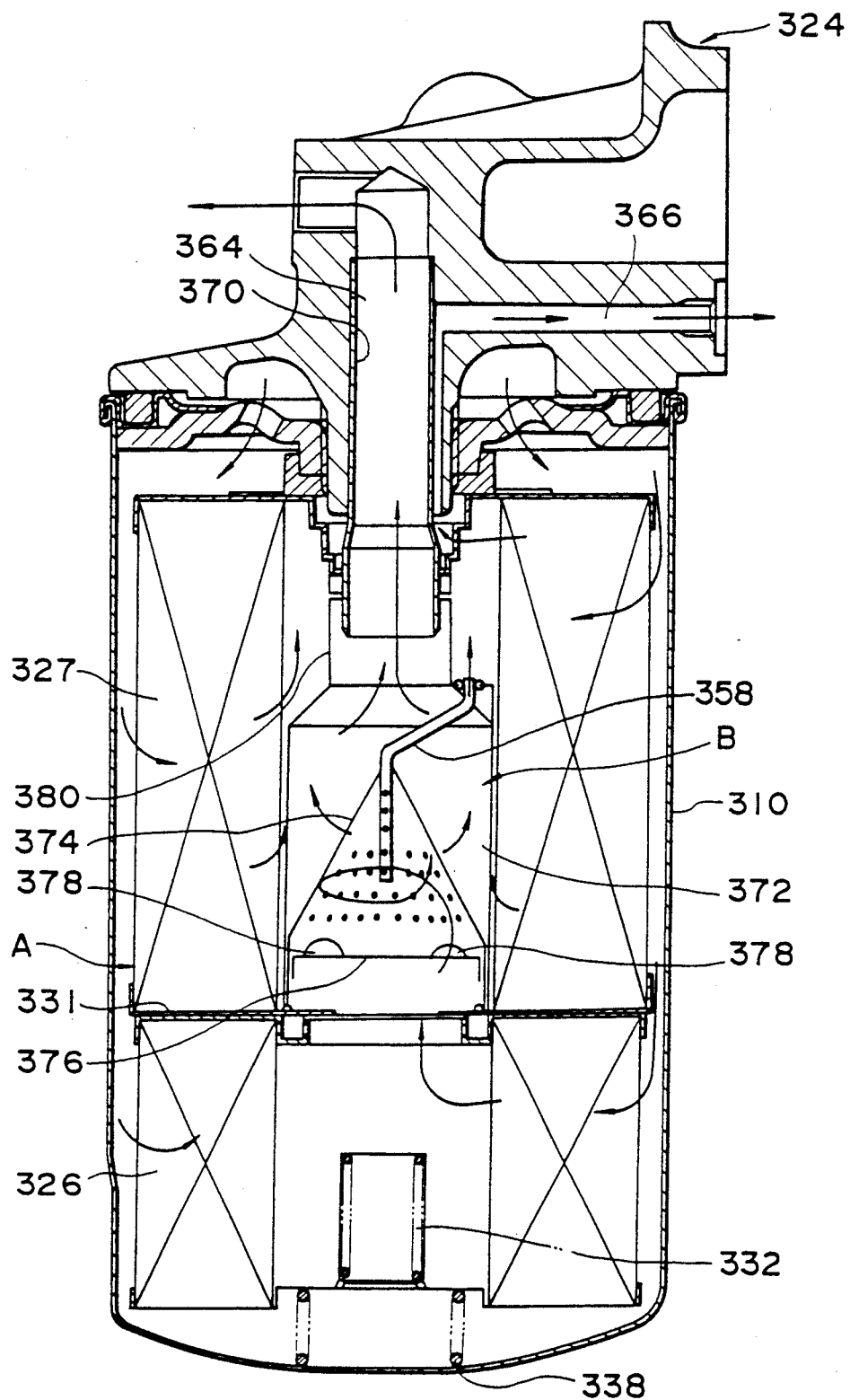
FIG. 16 is a view similar to FIG. 15 showing a modified form thereof.

In FIG. 15, a base plate 312 is secured to an upper end of housing 310 by a seam 314 and has a central opening defined by a downwardly projecting circular wall 318 of which inner surface is threaded. An aperture 320 is formed through the base plate 312 to surround the wall 318. A mount block 324 includes a downwardly extending sleeve 325 which is fitted in the central opening for threaded engagement with the wall 318. Fitted inside of the sleeve 325 is a tube 370 defining a first outlet passage 364 that is connected with the engine. The tube 370 further defines in cooperation with the sleeve 325 a slot 365 connected with a second outlet passage 366 leading to an oil pan. An inlet passage 336 is provided in the block 324 to open upon the aperture 320. The lower surface of block 324 is in tight contact with the periphery of base plate 312.

A separator unit A, for removing solid contaminants from the oil flowing into the housing 310 via aperture 320, comprises a primary or full-flow element 326 disposed in the lower portion of housing 310 and a secondary element 327 placed on the primary element 326. The primary element 326 is relatively rough and secured to upper and lower end plates 328, 330 while the secondary element is relatively fine and held between upper and lower end plates 329, 331. The end plate 331 lies on the end plate 328 and has an inward extension terminating at a flange 333 on which is fitted a pipe 334 extending to the tube 370 for providing a lower extension of the passage. 364 The pipe 334 extends along a center axis of the secondary element 327 with defining a circular space 335 therebetween which is connected with the slot 365 through an opening 337 formed in a flange 339 of the end plate 329, the flange 339 being fitted on the tube 370 in a liquid tight manner. The unit A is held in position by a spring 338 disposed between the bottom wall of housing 310 and the end plate 330 on which a relief valve 332 is provided for the purpose set forth above. Arranged within the inner space of the primary element 326 is a separator unit B comprising a casing 340 fixed to the end plate 328 and a funnel-shaped cyclone 342 secured to the casing 340. A removal pipe 358 of the unit B has a crank outside the cyclone 342 to open in the circular space 335.

A part of the oil introduced into the housing 310 passes through the secondary element 327 and is discharged via the circular space 335, opening 337 and the slot 365 into the outlet passage 366. The remaining oil flows downward in the housing 310 to pass through the primary element 326, where it is introduced into the cyclone 342 from inlets 348, as indicated by arrows. During the vortical flow in the cyclone 342, gas-rich oil is removed through orifices 360 into the pipe 358 which leads it to the circular space 335 for discharge. On the other hand, the filtered oil flows out of the cyclone 342 through pores 354 to be supplied to the engine via the outlet passage 364. Thus, the structure ensures the respective oil-flows without any mixture.

A modification of FIG. 16 is different from the above embodiment in that a separator unit B is arranged within the inner space of the secondary element 327 with providing a gap between the element 327 and a casing 372. The lower end of casing 372 as well as the lower end of a cyclone 374 is attached to the end plate 331 at a position surrounding the opening. A partition 376 is provided in the lower portion of cyclone 374 and has inlets 378 from which the oil that has passed through the primary element 326 is introduced to generate the vortical flow in the cyclone 374. The casing 372 includes an upper extension 380 of which end portion is fitted over the tube 370 so that the inner space of casing 372 communicates with the passage 364. A removal pipe 358 also has a crank to open in the circular space around the extension 380 for leading the gas-rich oil and the oil passing through the secondary element 327 to the outlet passage 366.

Although the present invention has been described with reference to the preferred embodiments thereof, many modifications and alterations may be made within the spirits of the invention.

What is claimed is:

1. An oil filter comprising:
   a housing opened at one end thereof;
   a first separator unit disposed in said housing for removing solid contaminants from the oil introduced into said housing, said first separator unit including a cylindrical filter element and upper and lower end plates attached respectively to the upper and lower ends of said filter element, said filter element having outer and inner peripheries; and
   a second separator unit for removing gaseous contaminants from the oil that has passed through said filter element, said second separator unit being disposed in the space defined by said inner periphery of said filter element and between said upper and lower end plates, said second separator unit including a chamber having means for generating a vortical flow of the oil introduced therein to thereby separate gas-rich oil which gathers in an axially central portion of said chamber, a first outlet passage means for discharging said gas-rich oil outside the oil filter and a second outlet passage means for leading the oil containing little gaseous contaminants outside the oil filter, said first and second outlet passage means extending into said housing from the open end thereof.

2. An oil filter as claimed in claim 1, wherein said second separator unit further includes a cylindrical casing having an open end and a bottom wall, a cyclone secured in and casing for defining said vortical flow generating means in cooperation with said bottom wall, and an inlet formed in the bottom wall of said casing for introducing the oil into said chamber along a tangential direction of said casing.

3. An oil filter as claimed in claim 2, wherein said inlet is formed by punch-pressing the wall of said casing to provide a deflector extending substantially along a tangent of said casing at said inlet.

4. An oil filter as claimed in claim 2, further comprising a center bolt for attaching said housing to a mount in an oil lubricating system, said center bolt extending in said housing along an axis thereof, and wherein said first outlet passage means comprises a removal passage formed in said center bolt and orifices formed in a portion of said center bolt extending in said cyclone, said orifices connecting said chamber with said removal passage.

5. An oil filter as claimed in claim 4, wherein said second outlet passage means comprises a plurality of pores formed in the wall of said cyclone, a space defined between said casing and said cyclone and the open end of said casing.

6. An oil filter as claimed in claim 2, wherein said first outlet passage means comprises a removal pipe extending into said chamber along the axis of said cyclone and having formed in the wall thereof a plurality of orifices for permitting the gas-rich oil to flow thereinto.

7. An oil filter as claimed in claim 6, wherein said removal pipe has a pressure regulating means whereby the gas-rich oil in said removal pipe is permitted to be discharged therefrom when a pressure in said removal pipe exceeds a predetermined value.

8. An oil filter as claimed in claim 6, wherein said second outlet passage means comprises a plurality of pores formed in the wall of said cyclone.

9. An oil filter as claimed in claim 8, wherein said bottom wall of said casing has formed at a central portion thereof a concave portion projecting into said chamber to face said inlet.

10. An oil filter as claimed in claim 8, wherein said second separator unit further comprises a helical guide plate attached to the inner surface of said cyclone for intensifying the vortical flow of the oil.

11. An oil filter as claimed in claim 10, wherein said second separator unit further comprises a column attached to the inner peripheral surface of said helical guide plate to face said inlet, said column having a diameter larger than a diameter of said removal pipe.

12. An oil filter as claimed in claim 8, wherein said cyclone is funnel-shaped and has a lower portion at a downstream end of the oil flow, and wherein said removal pipe is fitted in said lower portion.

13. An oil filter as claimed in claim 12, wherein said pores are formed only in an upper portion and an intermediate portion of said cyclone.

14. An oil filter as claimed in claim 13, wherein said pores have varying dimensions to be gradually enlarged toward the lower portion of said cyclone.

15. An oil filter as claimed in claim 12, wherein an outer diameter of said removal pipe is in the range from 15% to 35% of a maximum inner diameter at the upper portion of said cyclone.

16. An oil filter as claimed in claim 8, wherein said cyclone has a parabolic shape in longitudinal cross section containing the axis of said cyclone.

17. An oil filter as claimed in claim 8, further comprising a base plate fixed to said housing at the open end thereof, said base plate including an attachment means for attaching said housing to a mount in an oil lubricating system.

18. An oil filter as claimed in claim 17, wherein said base plate has formed therein an aperture allowing the oil to flow into said housing.

19. An oil filter as claimed in claim 18, further comprising a check valve arranged adjacent said aperture for preventing a backflow of the oil.

20. An oil filter as claimed in claim 17, wherein said base plate has a central opening.

21. An oil filter as claimed in claim 20, wherein said attachment means comprises a flange formed on the inner periphery of said base plate defining said central opening.

22. An oil filter as claimed in claim 21, wherein said flange has a threaded inner surface.

23. An oil filter as claimed in claim 20, wherein one of said end plates of said first separator unit on the side of the open end of said housing extends inwardly to abut against the outer surface of said flange, and wherein said second outlet passage means further comprises said central opening and a space defined between said cyclone and said casing.

24. An oil filter as claimed in claim 23, wherein said removal pipe extends in said central opening.

25. An oil filter as claimed in claim 20, wherein said second separator unit further includes a base ring attached to the lower end of said casing, and wherein said second outlet passage means further comprises the opening of said base ring and a space defined between said cyclone and said casing.

26. An oil filter as claimed in claim 25, wherein said removal pipe extends in the opening of said base ring.

27. An oil filter as claimed in claim 25, wherein said base ring is fixedly secured at the inner periphery thereof to the mount, and wherein said attachment means comprises the inner surface of said base plate defining said central opening, said inner surface being detachably secured to the outer periphery of said base ring.

28. An oil filter as claimed in claim 27, wherein said inner surface of said base plate is threadedly engaged with the outer periphery of said base ring.

29. An oil filter as claimed in claim 25, wherein said base ring is secured at the inner periphery thereof to the mount, and wherein said attachment means comprises an inner end portion of said base plate defining said central opening, said inner end portion being detachably secured to the mount.

30. An oil filter as claimed in claim 29, wherein said inner end portion of said base plate includes a threaded surface.

31. An oil filter as claimed in claim 29, wherein said casing is attached to the outer surface of said base ring, and further comprising a seal member fitted between said casing and one of said end plates of said first separator unit on the side of the open end of said housing.

32. An oil filter as claimed in claim 29, wherein said casing is attached to the inner surface of said base ring, and further comprising a seal member fitted between said base ring and one of said end plates of said first separator unit on the side of the open end of said housing.

33. An oil filter as claimed in claim 29, wherein said base ring and said inner end portion of said base plate defines an inlet passage for the oil into said housing.

34. An oil filter as claimed in claim 8, wherein said first separator unit further comprises an additional filter element and additional upper and lower end plates attached respectively to the upper and lower ends of said additional filter element, said additional filter element being finer than said filter element.

35. An oil filter as claimed in claim 34, wherein said filter element and said additional filter element are arranged side by side with one of said end plates of said filter element lying on one of the end plates of said additional filler element and wherein said second outlet passage means further comprises a pipe extending along an axis of said additional filter element and communicating with said pores.

36. An oil filter as claimed in claim 35, wherein said first outlet passage means further includes a circular space defined between said pipe and an inner periphery of said additional filter element, said removal pipe opening in said circular space.

37. An oil filter comprising:
   a housing opened at one end thereof;
   a first separator unit disposed in said housing for removing solid contaminants from the oil introduced into said housing, said first separator unit including a cylindrical primary filter element and a cylindrical secondary filter element aligned with each other, said secondary filter element being finer than said primary filter element;
   a second separator unit for removing gaseous contaminants from the oil that has passed through said primary filter element, said second separator unit being accommodated within the space defined by inner peripheries of said primary and secondary filter elements, said second separator unit including a chamber having means for generating a vortical flow of the oil introduced therein to thereby separate gas-rich oil which gathers in an axially central portion of said chamber;
   a first outlet passage means for discharging outside said housing said gas-rich oil and the oil that has passed through said secondary filter element; and
   a second outlet passage means for leading the oil containing little gaseous contaminants outside said housing;
   said first and second outlet passage means extending into said housing from the open end thereof.

38. An oil filter as claimed in claim 37, wherein said first separator unit further comprises a pair of first end plates attached to said primary filter element and a pair of second end plates attached to said secondary filter element, one of said first end plates lying on one of said second end plates.

39. An oil filter as claimed in claim 38, wherein said second separator unit is disposed between said pair of first end plates and surrounded by the inner periphery of said primary filter element.

40. An oil filter as claimed in claim 39, wherein said second separator unit further includes a cylindrical casing having a bottom wall and an opening opposite to said bottom wall, a cyclone secured in said casing for defining said vortical flow generating means in cooperation with said bottom wall, and an inlet formed in the bottom wall of said casing for introducing the oil into said chamber along a tangential direction of said casing.

41. An oil filter as claimed in claim 40, wherein said second outlet passage means comprises a plurality of pores formed in the wall of said cyclone, a space defined between said cyclone and said casing, said opening of said casing, and a pipe connected to said opening and extending in the space defined by the inner periphery of said secondary filter element.

42. An oil filter as claimed in claim 41, wherein said first outlet passage means comprises a removal pipe extending into said chamber along the axis of said cyclone and having formed i the wall thereof a plurality of orifices for permitting the gas-rich oil to flow thereinto, and a circular space defined between said pipe and the inner periphery of said secondary filter element, said removal pipe opening in said circular space.

43. An oil filter as claimed in claim 38, wherein said second separator unit is disposed between said pair of second end plates and surrounded by the inner periphery of said secondary filter element.

44. An oil filter as claimed in claim 43, wherein said second separator unit further includes a substantially cylindrical casing having means for receiving the oil that has passed through said primary element, a cyclone secured in said casing for defining said vertical flow generating means, and an inlet for introducing the oil into said cyclone.

45. An oil filter as claimed in claim 44, wherein said second outlet passage means comprises a plurality of pores formed in the wall of said cyclone and the space in said casing.

46. An oil filter as claimed in claim 45, wherein said first outlet passage means comprises a removal pipe extending into said chamber along the axis of said cyclone and having formed in the wall thereof a plurality of orifices for permitting the gas-rich oil to flow thereinto, and a circular space defined between said casing and the inner periphery of said secondary filter element, said removal pipe opening in said circular space.

* * * * *